INVENTOR.
DOUGLAS LOUIS ASHTON DRIVER
ATTORNEY

Patented Aug. 28, 1951

2,565,483

UNITED STATES PATENT OFFICE 2,565,483

PROCESS FOR MANUFACTURING SELENIUM CELLS

Douglas Louis Ashton Driver, London, England, assignor, by mesne assignments, to International Standard Electric Corporation, New York, N. Y., a corporation of Delaware Original application May 30, 1945, Serial No. 596,697. Divided and this application October 28, 1947, Serial No. 783,341. In Great Britain May 5, 1944

7 Claims. (Cl. 175—366)

The invention relates generally to an improved method for the manufacture of selenium cells such as dry rectifiers and photocells and in a more particular sense it is concerned with articles, useful in making such cells wherein the selenium is utilized in a new form.

When selenium is employed in the manufacture of electric rectifiers or photo-electric cells, it is usually applied to the metal base plates in the form of powder which, after spreading over the plates is then subjected to heat and pressure to form an adherent coating.

According to the present invention the selenium is utilized in the form of a felted or matted mass of filaments or fibres resembling, in appearance, glass wool. This selenium felt or mat may be manufactured in continuous sheets or strips of any desired thickness and discs or other suitable shaped pieces may be cut therefrom. These pieces may be made in the proper size to be pressed directly on the base plates to form the desired coated plates which are subsequently processed and completed according to any of the well known methods used in the manufacture of rectifiers or photo-electric cells.

The selenium felt or wool may be produced by spraying molten selenium from one or more nozzles by air or gas under pressure. The selenium forms into fibers immediately on extrusion from the nozzles, and the fibres mat together to form a loosely felted wool-like mass. As will be explained in detail below, the spraying apparatus may be similar to that used for flameless metal spraying. The spraying nozzles consist of a narrow inner pipe, the mouth of which is surrounded by an annular nozzle to which compressed air is supplied for ejecting the selenium, and the supply of selenium to the inner pipe may be controlled by a needle valve.

The invention will be explained with reference to the accompanying drawings in which.

Figure 1:
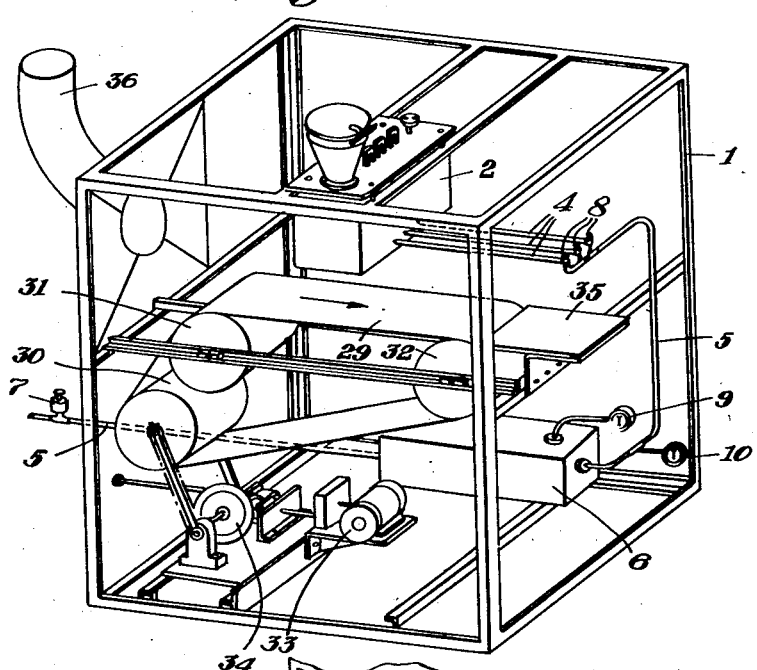
Fig. 1 shows a perspective view of apparatus for producing selenium felt or wool according to the invention.

A perspective view of an apparatus for producing the selenium felt is shown in Fig. 1 of the accompanying drawings.

The apparatus is mounted in an enclosure built around a rectangular frame 1 of angle-iron. The top and sides of the enclosure have been removed in order to show the internal parts. Supported from the top of the frame on transverse bars is the selenium sprayer 2 which comprises an electrically heated hollow metal tank. Three or other suitable number of spraying nozzles 3 (not visible in Fig. 1) are fixed through the bottom of the sprayer tank. The selenium is heated in the tank to a temperature above 220° C. so as to maintain it in a molten condition, and is blown through the nozzles by compressed air supplied from pipes 4 each fed from a main air pipe 5 which passes through a heating box 6. The main air supply is controlled by a reduction valve 7 and individual needle valves 8 control the air supply to the pipes 4. A thermometer 9 and pressure gauge 10 are provided for the main air supply. Individual needle valves (not shown) are provided for the nozzles 3 to control the supply of the melted selenium.

An endless band 29 is driven continuously in the direction of the arrow over rollers 30, 31 and 32 by means of an electric motor 33. The drive includes a variable speed gear 34 by which the velocity of the band may be adjusted. The horizontal portion of the band travels beneath the nozzles 3 of the sprayer 2. The selenium emerging from the nozzles solidifies into fine fibres which consolidate upon the band and form a loosely matted felt like that shown in Figs. 2 and 3. The thickness of the felt depends on the number of nozzles, on the rate at which the selenium is sproyed, and on the velocity of the band 26. A fixed horizontal platform 35 placed close to the band 29 where it turns down over the edge of the edge of the roller 32 is employed to intercept the strip of felt which is continuously formed, and to direct it out of the apparatus. An exhaust flue 36 is provided to remove undesirable fumes from the inside of the apparatus.

The spacing of the nozzles 3 and their distance from the band 29 should be adjusted so that a selenium felt of even thickness is obtained.

The felt or wool manufactured in this manner may be stored in rolls if desired, and may be cut up into discs of the proper size and shape for pressing directly onto the metal base-plates in the manufacture of rectifiers or photo-electric cells.

Figure 2:
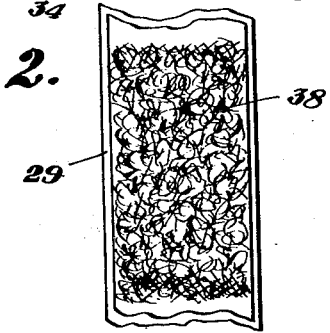
Fig. 2 shows a top view of part of a strip of selenium felt which has been sprayed onto a metal plate.
Figure 3:
Fig. 3 shows a transverse section of Fig. 2.

In accordance with this last modification of the invented process, the metal base-plates are fed from the left hand side onto the band 29 and are covered directly with the selenium felt as they pass under the nozzles 3, or a large piece of sheet metal is passed under the nozzles on the band (or by other means) and is covered with a layer of felt of suitable thickness which is afterwards pressed onto the sheet to form the desired selenium coating. The covered metal sheet is then cut into discs of the desired size. Figs. 2 and 3 show such a metal sheet 37 covered with a layer of felt 38 and supported on the travelling band 29.

The pressing of the selenium felt onto the base plate takes place in a press at a suitable temperature for obtaining the selenium coating in the desired form, the process being similar to that employed when selenium is applied to the plates in the form of powder, except that the pressing time is different and generally shorter under otherwise similar conditions. The pressing may for example takes place at temperatures between about 100° C. and 145° C. at pressures between about 800 and 6000 pounds per sq. inch, the necessary pressing times varying between about ¾ and 5 minutes.

Figure 4:
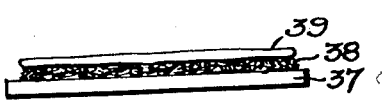
Fig. 4 is an end elevation of a complete rectifier unit made in accordance with the present invention.

After coating the base plate in this manner the selenium may be further heat treated according to the usual practice in order to produce the desired electrical semiconductor properties, and the counterelectrode is then applied over the selenium coating, as shown in Fig. 4, wherein base plate 37 is covered by a layer 38 of felted selenium with a super-imposed counterelectrode alloy layer 39 forming the other rectifier electrode. In the case of a photo-electric cell, this counterelectrode will, of course, be of transparent or translucent.

In the following claims the term "selenium cell" means both a selenium rectifier cell and a selenium photo-cell.

This application is a division of co-pending application Serial Number 596,697, filed May 30, 1945, entitled "Manufacture of Selenium Products," now Patent No. 2,445,768, issued July 27, 1948.

I claim:

1. An article useful in the manufacture of selenium cells comprising a metallic base element bearing an adherent layer comprising hot pressed felted selenium fibers.

2. An article useful in the manufacture of selenium cells comprising a metallic base element bearing an adherent layer comprising a felt formed of selenium fibers loosely matted together and hot pressed onto the base.

3. In the manufacture of selenium cells of the type comprising a base element bearing a layer of selenium, the improvement that comprises coating a base plate with selenium by placing upon the plate a piece of selenium felt and compressing the felt onto the plate at an elevated temperature.

4. In the manufacture of selenium cells of the type comprising a base element bearing a layer of selenium, the improvement that comprises coating a base plate with selenium by spraying molten selenium on to the plate under air or gas pressure in such manner as to form thereon selenium felt of appropriate thickness, and compressing the felt onto the plate at an elevated temperature.

5. The method according to claim 4 in which the compressing is performed at a temperature below the melting point of selenium.

6. The method according to claim 4 in which the compressing is performed at a temperature between 100° C. and 145° C., the pressure employed lying between 800 and 6000 pounds per sq. inch.

7. The method of manufacturing a selenium cell which comprises the steps of compressing a matted mass of selenium filaments onto a metal base-plate to form a coating thereon, heat-treating the said selenium coating, and applying a counterelectrode to the said selenium coating.

DOUGLAS LOUIS ASHTON DRIVER.

REFERENCES CITED

The following references are of record in the file of this patent:

UNITED STATES PATENTS

| Number | Name | Date |
|---|---|---|
| 2,379,919 | Miller et al. | July 10, 1945 |